US010375183B2

(12) United States Patent
Saeta et al.

(10) Patent No.: US 10,375,183 B2
(45) Date of Patent: Aug. 6, 2019

(54) EVENTING ANALYSIS FRAMEWORK

(71) Applicant: Coursera, Inc., Mountain View, CA (US)

(72) Inventors: Brennan Saeta, Menlo Park, CA (US); Huy Le, Castro Valley, CA (US); Jiquan Ngiam, Mountain View, CA (US)

(73) Assignee: COURSERA, INC., Mountain View, CA (US)

( * ) Notice: Subject to any disclaimer, the term of this patent is extended or adjusted under 35 U.S.C. 154(b) by 569 days.

(21) Appl. No.: 14/203,275

(22) Filed: Mar. 10, 2014

(65) Prior Publication Data

US 2014/0281913 A1 Sep. 18, 2014

Related U.S. Application Data

(60) Provisional application No. 61/788,983, filed on Mar. 15, 2013.

(51) Int. Cl.
*G06F 17/20* (2006.01)
*H04L 29/08* (2006.01)
*G06F 15/16* (2006.01)
*H04N 21/442* (2011.01)

(52) U.S. Cl.
CPC .............. *H04L 67/22* (2013.01); *G06F 15/16* (2013.01); *H04N 21/44222* (2013.01)

(58) Field of Classification Search
CPC .... G06F 15/16; H04N 21/44222; H04L 67/22
USPC ........................................................ 715/201
See application file for complete search history.

(56) References Cited

U.S. PATENT DOCUMENTS

| 6,473,794 | B1 * | 10/2002 | Guheen | H04L 41/22 709/223 |
| 6,536,037 | B1 * | 3/2003 | Guheen | G06F 8/71 703/2 |
| 6,615,166 | B1 * | 9/2003 | Guheen | G06Q 10/06 703/26 |
| 6,721,713 | B1 * | 4/2004 | Guheen | G06Q 50/01 705/1.1 |
| 6,957,186 | B1 * | 10/2005 | Guheen | G06Q 90/20 705/323 |
| 7,315,826 | B1 * | 1/2008 | Guheen | G06F 17/3089 703/27 |
| 8,121,874 | B1 * | 2/2012 | Guheen | G06Q 10/063 705/28 |

(Continued)

*Primary Examiner* — Mohammed H Zuberi
(74) *Attorney, Agent, or Firm* — Brake Hughes Bellermann LLP

(57) ABSTRACT

A web browser renders a web page, where textual information is displayed in a first portion of the page and where streaming video is displayed in a second portion of the page. As a user interacts with the page and views the video, both page view values and video data values are sent out from the browser, across a single TCP/IP connection, and to a single analytics web server, where both types of values are stored. The page view values may, for example, indicate when the user clicks on buttons, keys or links. The video data values may, for example, indicate the settings or play status of the video player application program. The analytics web server receives the two types of values, performs real-time processing using the values, and outputs a report in real time where the report includes a real-time analysis of both types of data values.

18 Claims, 7 Drawing Sheets

(56) References Cited

U.S. PATENT DOCUMENTS

| | | | | |
|---|---|---|---|---|
| 8,683,501 B2* | 3/2014 | Huegel | ............... | G06Q 30/02 348/14.01 |
| 2002/0197593 A1* | 12/2002 | Sutton | ............... | G09B 5/00 434/276 |
| 2006/0129907 A1* | 6/2006 | Volk | ............... | G06F 17/2247 715/201 |
| 2007/0020604 A1* | 1/2007 | Chulet | ............... | G09B 5/06 434/350 |
| 2011/0029666 A1* | 2/2011 | Lopatecki | ............... | G06F 15/16 709/224 |
| 2014/0040786 A1* | 2/2014 | Swanson | ............... | G06F 17/30899 715/760 |
| 2015/0220235 A1* | 8/2015 | Tully | ............... | G06Q 30/0271 715/760 |
| 2015/0220502 A1* | 8/2015 | Tully | ............... | G06F 17/2252 715/242 |
| 2015/0222493 A1* | 8/2015 | Tully | ............... | G06F 17/2252 715/234 |
| 2015/0222693 A1* | 8/2015 | Tully | ............... | G06F 16/957 709/203 |

* cited by examiner

VIDEO SERVING AND EVENTING SYSTEM

EXAMPLE OPERATION OF THE VIDEO
SERVING AND EVENTING SYSTEM

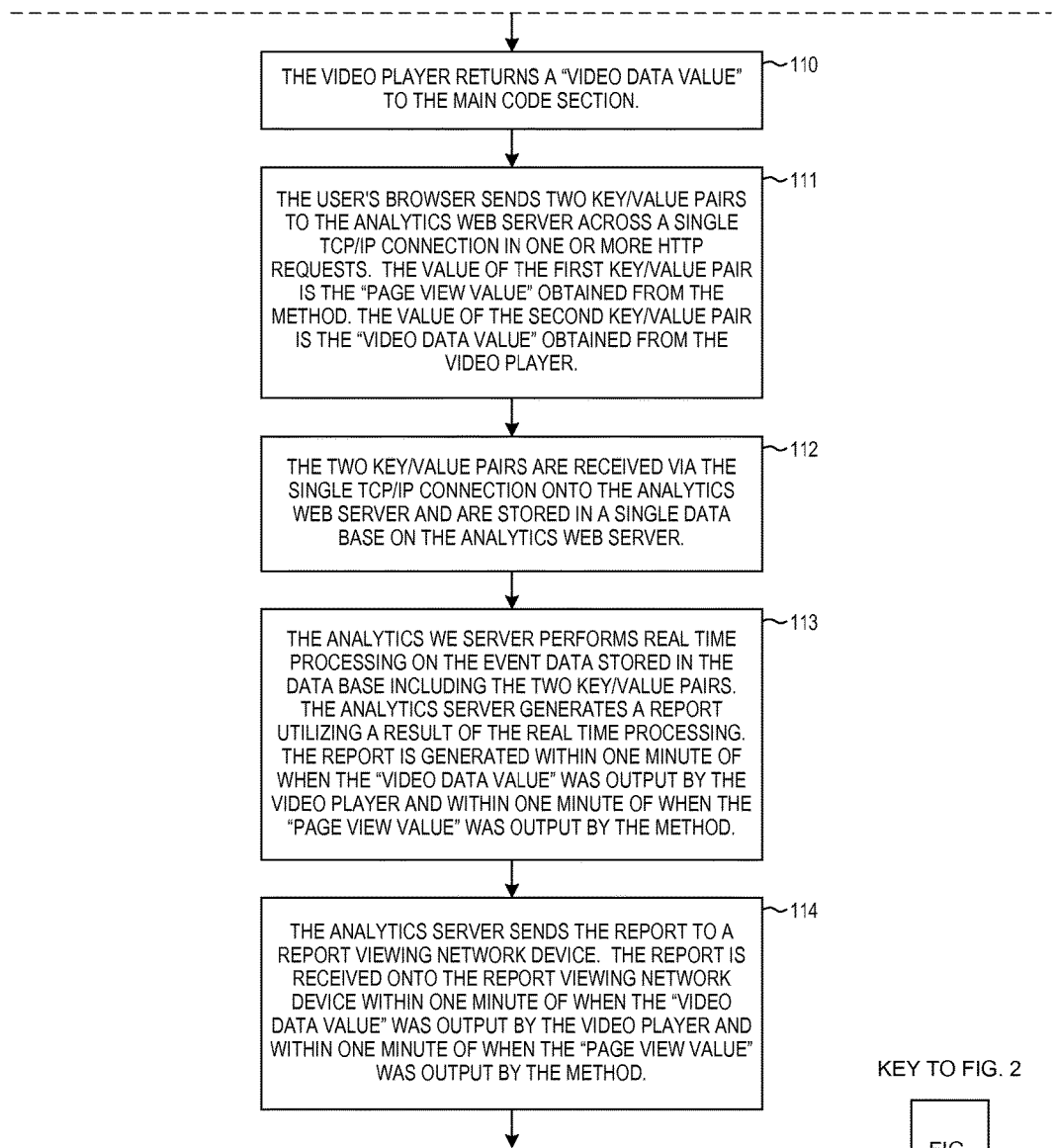
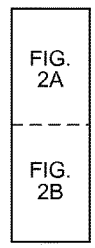
EXAMPLE OPERATION OF THE VIDEO SERVING AND EVENTING SYSTEM
FIG. 2B

| DESCRIPTION | EVENT NAME | PAGE VIEW KEYS AND PAIRED VALUES |
|---|---|---|
| VIEW A PAGE: URL, USER, SESSION, LANGUAGE | pageview | GET /info?key=pageview&value=&url=http://www.coursera.org/&user=23435345&session=123568sdfq3asdfw341&language=en |
| CLICK A LINK: URL, USER, SESSION, LANUGAGE, CLICKED LINK | user.click | GET /info?key=user.click&value={"url":"http://class.coursera.org/yolo-001"}&url="https://www.coursera.org/"&user=12345&session=123534xcasersdf234 |
| CLICK ON A SCRIPT WITH ERROR: URL, USER, SESSION, LANUGAGE, CLICKED LINK, MESSAGE, SCRIPT, LINE | page.error.javascript | GET /info?key=page.error.javascript&value={"message":"Null deference","script":"https://www.coursera.org/static/pageScript.js","line":301}&url=https://www.coursera.org/&user=12345&session=1235ajsdfjkasefj;adsf |
| ACTION REQUIRING API CALL: PAGEVIEW INFO PLUS TIMING, URL, PARAMS, STATUS, CLOUDFRONT AGE, CACHE HIT | api.ok.200 | GET /info?key=api.ok.200&value={"timing":294,"url":"/maththink-004/api/forum/forums/0/threads","params":{"sort":"lastupdated","page":1,"page_size":5},"status":200,"cf_age":null,"cf_hit":null}&url=http://www.coursera.org/&user=1234&session=123445asdfasdf |
| API CALL FAILED: PAGEVIEW INFO PLUS TIMING, URL, PARAMS, STATUS, CLOUDFRONT AGE, CACHE HIT | api.fail.400 | GET /info?key=api.fail.400&value={"msg":"Bad Request","url":"/api/maestro/enroll","code":400,"timing":252}&url=http://www.coursera.org/&user=12345&session=123445asdfasdf |
| SCROLL: PAGEVIEW INFO PLUS PIXELS DOWN SCREEN | user.scroll | GET /info?key=user.scroll&value=823&url=http://www.coursera.org/&user=12345&session=123445asdfasdf |

PAGE VIEW KEYS

FIG. 4

| DESCRIPTION | EVENT NAME | VIDEO DATA KEYS AND PAIRED VALUES |
|---|---|---|
| PLAY A VIDEO: PAGEVIEW INFO PLUS CURRENT TIME, PLAYBACK RATE, LECTURE ID, VOLUME | user.video.lecture.play | GET /info?key=user.video.lecture.play&value={"currentTime":141.293548,"playbackRate":1,"error":null,"networkState":1,"readyState":4,"lectureID":51,"eventTimestamp":1394137297581,"initTimestamp":1394137241278,"prevTime":141.292681}&url=http://class.coursera.org/yolo-002&user=12345&session=12345asdfsadf |
| PAUSE A VIDEO: PAGEVIEW INFO PLUS CURRENT TIME, PLAYBACK RATE, LECTURE ID, VOLUME | user.video.lecture.pause | GET /info?key=user.video.lecture.pause&value={"currentTime":141.293548,"playbackRate":1,"error":null,"networkState":1,"readyState":4,"lectureID":51,"eventTimestamp":1394137297581,"initTimestamp":1394137241278,"prevTime":141.292681}&url=http://class.coursera.org/yolo-002&user=12345&session=12345asdfsadf |
| SEEK WITHIN A VIDEO: PAGEVIEW INFO PLUS CURRENT TIME, PLAYBACK RATE, PAUSED, PREVIOUS TIME, LECTURE ID, VOLUME | user.video.lecture.seek | GET /info?key=user.video.lecture.seek&value={"currentTime":141.293548,"playbackRate":1,"error":null,"networkState":1,"readyState":4,"lectureID":51,"eventTimestamp":1394137297581,"initTimestamp":1394137241278,"prevTime":241.292681}&url=http://class.coursera.org/yolo-002&user=12345&session=12345asdfsadf |
| SPEEDING UP OR SLOWING DOWN WITHIN A VIDEO: PAGEVIEW INFO PLUS CURRENT TIME, PLAYBACK RATE, LECTURE ID, VOLUME | user.video.lecture.speed | GET /info?key=user.video.lecture.seek&value={"currentTime":141.293548,"playbackRate":1.5,"error":null,"networkState":1,"readyState":4,"lectureID":51,"eventTimestamp":1394137297581,"initTimestamp":1394137241278,"prevPlaybackRate":1}&url=http://class.coursera.org/yolo-002&user=12345&session=12345asdfsadf |
| CHANGE VIDEO VOLUME: PAGEVIEW INFO PLUS CURRENT TIME, PLAYBACK RATE, LECTURE ID, PREVIOUS AND CURRENT VOLUME | user.video.lecture.volume | GET /info?key=user.video.lecture.seek&value={"currentTime":141.293548,"playbackRate":1,"error":null,"networkState":1,"readyState":4,"lectureID":51,"eventTimestamp":1394137297581,"initTimestamp":1394137241278,"volume":80,"prevVolume":65}&url=http://class.coursera.org/yolo-002&user=12345&session=12345asdfsadf |

VIDEO DATA KEYS

FIG. 5

HTTP REQUEST INVOLVING A
PAGE VIEW KEY

HTTP REQUEST INVOLVING A
VIDEO DATA KEY

EVENTING ANALYSIS FRAMEWORK

CROSS-REFERENCE TO RELATED APPLICATION

This application claims the benefit under 35 U.S.C. § 119 from provisional U.S. patent application Ser. No. 61/788,983, entitled "Eventing Analysis Framework," filed on Mar. 15, 2013. This application expressly incorporates by reference the entire content of provisional U.S. patent application Ser. No. 61/788,983.

TECHNICAL FIELD

The described embodiments relate generally to web analytics.

BACKGROUND INFORMATION

It is often desirable to know how internet users interact with served web content and to learn other information about those who download the served web content. A field generally described as "analytics" involves embedding code into web pages, or otherwise causing the web browsers of users to be provisioned with tracking code, such that the browsers of users will then send reporting information (for example, information about the users interaction with the web pages, or other information about the users or their computers) out from the browsers and across the internet to a central receiving monitoring entity. The central monitoring entity typically analyzes the information to determine how users interacted with the served web content. Google Analytics and YouTube Analytics are two publicly available analytics products that are made freely available to those who seek to provide their web content on the internet. An entity that wishes to provide web pages on the internet for downloading by others may, for example, include code into the web pages. How this code can be written and deployed is described in Google Analytics and YouTube Analytics documentation. The resulting code as embedded in the served web page will then cause a browser that downloads the web page to send reporting information back to a specified server. The entity can then access the server to view the reported information. Google Analytics and YouTube Analytics provide such analytics services to those who wish to provide their content on the web.

SUMMARY

A first user uses a web browser to access a web page. The web page is downloaded onto the first user's network device. A web browser on the first user's network device renders the web page so that the web page is viewable on a display of the first user's network device. Textual information is displayed in a first portion of the web page and streaming video is displayed in a second portion of the web page. The first user then interacts with the web page and views the textual information and the video.

In a first novel aspect, as the first user interacts with the web page, the web browser causes both a "page view value" and a "video data value" to be sent out from the browser, and across a single TCP/IP connection, and to a single receiving network device. The page view value is the type of value that indicates page view information such as when the first user clicks on a button, selects a key, selects a link, or selects another graphical user interface element commonly found on web pages. The video data value is the type of value that indicates a setting or play status of a video player application program. The page view value is obtained by making a method call to an amount of method code previously downloaded from the analytics web server. The video data value, on the other hand, is obtained by making an API call to the video player program executing on the first user's network device, and then having the video player program return the video data value in response to the API call. In one example, the page view value is sent out of the browser and to the receiving network device in the payload of a first HTTP request as a first key/value pair, where the key indicates the particular type of page view value being communicated. The video data value is sent out of the browser and to the receiving network device in the payload of a second HTTP request as a second key/value pair, where the key indicates the particular type of video data value being communicated. Alternatively, the two key/value pairs may be communicated out of the browser of first user's network device in a single HTTP payload. Regardless of whether the two key/value pairs are communicated in one or in two HTTP communications, the two key/value pairs (one pair contains a page view data value and the other pair contains a video data value) are communicated across the same single TCP/IP connection to a single receiving network device.

In a second novel aspect, a novel analytics web server receives the page view value and the video data value via the single TCP/IP connection. Both types of values are then stored in a single data base on the analytics web server. An analytics program executing on the analytics web server performs real-time analysis of the stored data including the two incoming page view and video data values, and can be made to output a report in real time where the report includes a real-time analysis of both types of data values. In one example, a second user uses a report viewing network device to request such a real-time report from the analytics web server. The request is sent to the analytics web server as an HTTP request. The analytics web server responds by generating the report and returning the report. The report is received onto the report viewing network device as the payload of an HTTP response. The report is received within one minute of when the "video data value" was output by the video player and within one minute of when the page view value was output by the method.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 2A and 2B together form a single larger FIG. 2, which is a flowchart of a method in accordance with one novel aspect.

FIG. 4 is a table that sets forth examples of page view keys and the formats of their associated page view values.

FIG. 5 is a table that sets forth examples of video data keys and the formats of their associated video data values.

DETAILED DESCRIPTION

Reference will now be made in detail to some embodiments of the invention, examples of which are illustrated in the accompanying drawings.

Figure 1:
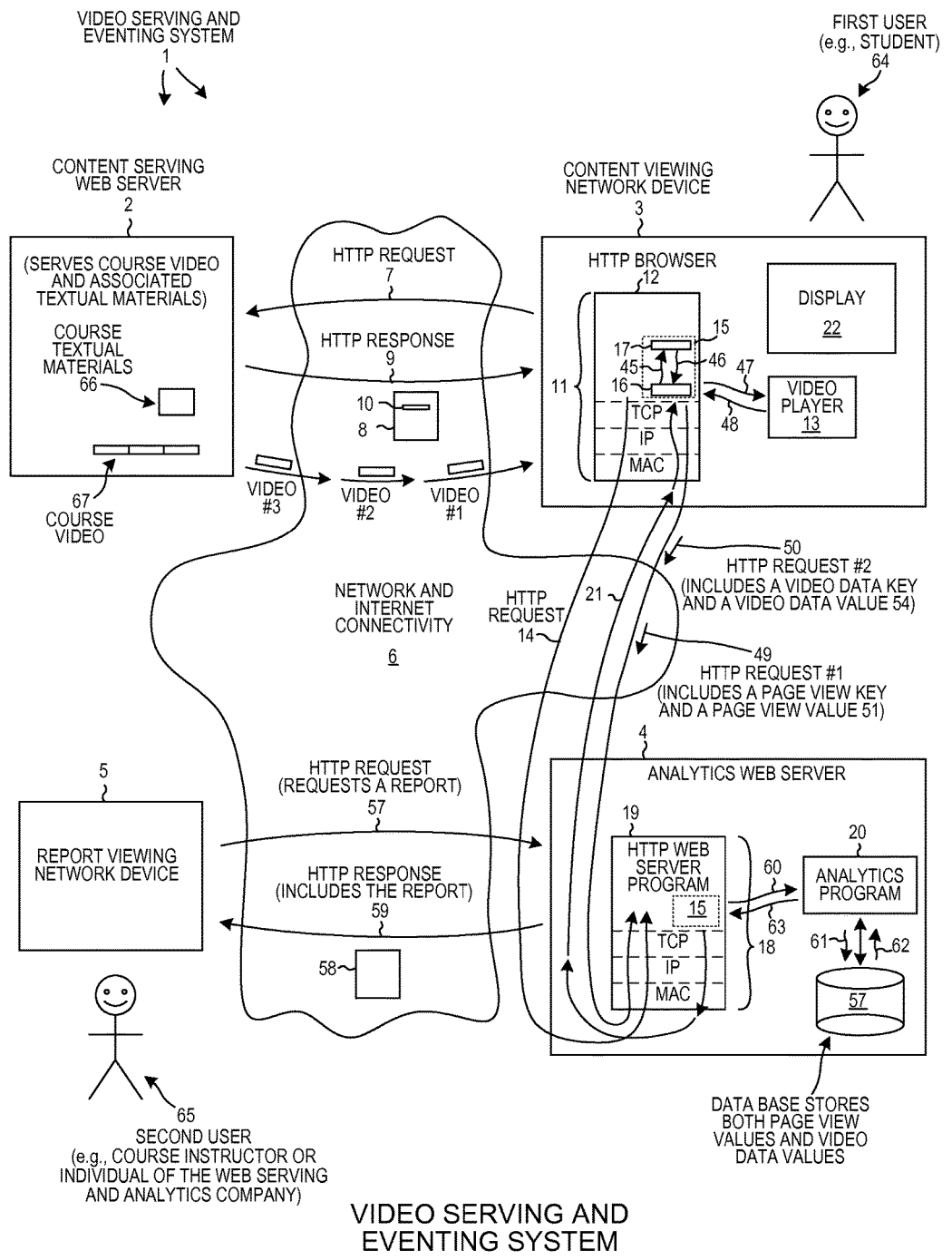
FIG. 1 is a diagram of an video serving and eventing system in accordance with one novel aspect.

FIG. 1 is a diagram of a video serving and eventing system 1. System 1 involves a web server 2 that serves web content to be viewed via the internet by users, a content viewing network device 3, an analytics web server 4, a network device 5 usable to retrieve and view a report, and network and internet connectivity 6. System 1 is usable to track, analyze and report user's interactions with the served web content.

Figure 2A:
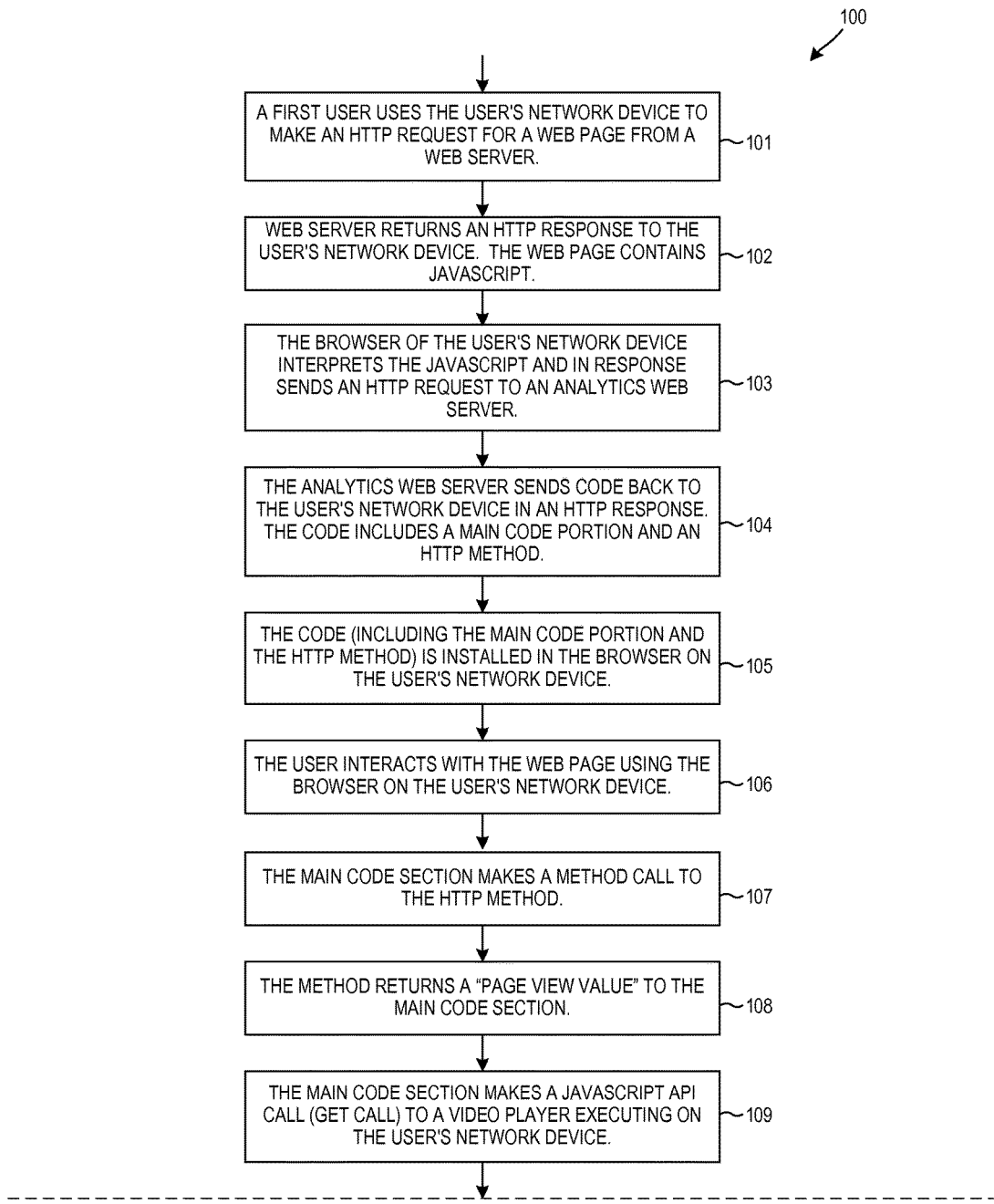

FIG. 2 is a flowchart showing steps 101-114 of a method 100 of receiving an HTTP request that includes both page view values and video data values. A first user 64 uses network device 3 to make an HTTP request 7 (step 101) for a web page 8 from the web server 2. The first user 64 in this case is a student who wishes to view an instructional video 66 and associated textual materials 67 for a course provided by an instructor, where the instructor has previously engaged a web serving and analytics company to serve the course materials 66 and 67 to students via the internet. The video serving and eventing system 1 is provided by the web serving and analytics company. Although in some embodiments the web serving and analytics company owns and operates both the content serving web server 2 as well as the analytics web server 4, in the presently described embodiment the content serving web server 2 is owned and operated by a company other than the analytics and web server company 4. The owner of the content serving web server 2 is engaged to store and serve the course materials 66 and 67, whereas the monitoring of the use of those materials by students is carried out by the analytics web server 4 that is maintained and operated by the web serving and analytics company.

In response to the HTTP request 7, the content serving web server 2 returns (step 102) an HTTP response 9 to the network device 3. The web page 9 contains an amount of javascript tracking code 10. A stack 11 of protocol processing layers includes a MAC layer, an IP layer, a TCP layer and an application layer. The application layer in this case includes an HTTP browser 12 application layer program. Also executing on the network device 3 is a video player 13 application layer program. The browser 12 interprets (step 103) the javascript tracking code 10 and in response sends an HTTP request 14 to the analytics web server 4. HTTP request 14 is a request to download a file containing an amount 15 of javascript code. The amount 15 of javascript code includes code for an HTTP method 17 (also called an HTTP verb). A stack 18 of protocol processing layers executes on the analytics web server 4, where an HTTP web server program 19 is one of the application layer programs. An analytics program 20 is another of the application layer programs. In response to the HTTP request 14, the HTTP web server program 19 returns (step 104) the requested amount 15 of javascript code via an HTTP response 21. The HTTP response 21 is passed back to the network device 3 and up the stack 11 to the browser 12. The amount 15 of javascript code is installed (step 105) in the browser 12 so that the installed code includes a main code portion 16 and the code 17 for the HTTP method. If the necessary amount 15 of code as required by the tracking code 10 has already been previously downloaded and is available in cached form in the browser 12, then this step of downloading the amount 15 of code is skipped, and the cached code is simply used. Regardless of whether the amount 15 of code is downloaded at this time or was previously downloaded and is available in cached form, the resulting installed javascript (javascript tracking code 10 and HTTP methods to be called) runs in the browser 12 so that when the first user 64 (the student, in this case) uses browser 12 to browse the web page, the browser 12 will detect the user's interactions with the web page and will send information about how the user interacted with the web page back to the analytics web server 4. In the example of FIG. 1, the browser 12 renders the web page 8 on a display 22 of the network device 3 for viewing by the user. As mentioned above, the first user 64 in this case is a student who wishes to view an instructional video and related textual materials provided by an instructor. The instructor has engaged the web serving and analytics company to use the company's tracking and analytics system 1 to serve the content to students, such as student 64, and to monitor the students' interactions with the served content.

Figure 3:
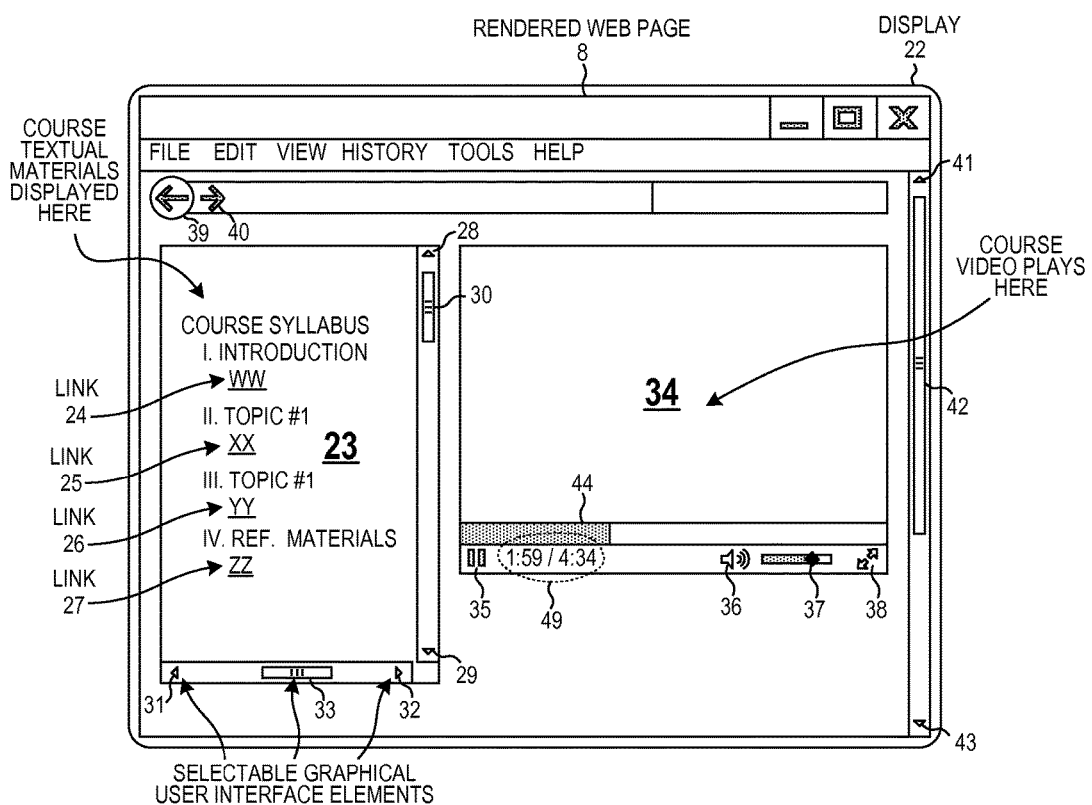
FIG. 3 is a diagram of a web page that is rendered on the display of the network device of FIG. 1.

FIG. 3 is a diagram of the web page 8 as rendered on the display 22 of network device 3 by browser 12. Textual materials that inform the user (the student) about a related instructional video are displayed in a first portion 23 of the web page 8. The textual materials include user selectable graphical user interface elements such as links 24-27. Using the browser, the user can scroll up and down through the textual material by clicking on scroll arrows 28 and 29, or by dragging a vertical scroll bar 30. Similarly, the user can scroll left and right through the textual material by clicking on scroll arrows 31 and 32, or by dragging a horizontal scroll bar 33. The instructional video that is associated with the textual material is viewable in a second portion 34 of the rendered web page. The second portion 34 is a window whose content is generated and supplied by the video player application program 13. The video that is viewed in second portion 34 is typically communicated from web server 2 across another network connection in a different file format to the video player 13. The communication of the video is illustrated in FIG. 1 by the three arrows labeled VIDEO#1, VIDEO#2 and VIDEO#3. Using browser 12, the first user 64 can pause the video or cause the video to start playing again by selecting a pause/play toggle graphical element 35. The user can mute the audio output of the video stream by selecting graphical element 36. The user can also adjust the volume of the audio by moving the selectable graphical user interface element 37. The user can use graphical user interface element 38 to adjust the size of the window of the second portion 34. The rendered web page 8 also includes numerous other user selectable graphical user interface elements 39-43. The current play location in the overall video stream is displayed in progress bar 44. The user can click on the progress bar to move the current play location of the video. The current play location in the overall video, as well as the duration of the overall video stream, is also illustrated in numerical characters 49. In the illustrated example, the current play location is 1:59 (one minute and 59 seconds) into the overall video whose duration is 4:34 (four minutes and 34 seconds).

In the example of the method 100 of FIG. 2, the first user 64 (the student) uses a mouse, a keyboard, a keypad, a touchpad or other user input devices of the network device 3 to interact (step 106) with the web page, for example by clicking on certain graphical user interface elements. In the present example, in a first click the user 64 selects a graphical user interface element other than the graphical user interface elements of the second portion. As a result, the main code section 16 as interpreted by the browser 12 detects the user action and in response makes a method call (step 107) to the method portion 17 of the downloaded code. For example, HTTP methods (verbs) include GET and POST. This method call is represented in FIG. 1 by arrow 45. In response, the HTTP method 17 returns (step 108) a "page view value" to the main code section 16. The page view value is the value of an associated "page view key". The return of the "page view value" is represented in FIG. 1 by arrow 46.

In one example, the script of the main code section 16 and the HTTP method 17 that tracks user interaction with the web page 8 to obtain the page view value 53 mentioned above is implemented in the same manner as is the Google Analytics Tracking Code (script tracking code) and its associated Phpscript 18 KB file (ga.js) to be downloaded from Google when Google Analytics are employed. The Google Analytics Tracking Code and the Phpscript file is freely available on the internet from Google Analytics.

FIG. 4 is a table that sets forth various exemplary page view keys. For each page view type of event, the right column of FIG. 4 gives examples of the format of the page view key and associated page view value. The illustrated example of a "pageview" event includes four key/value pairs for the keys url, user, session and language. The page view value that is associated with the page view key "url" is www.coursera.org, which is returned by the HTTP method GET and indicates that link 24 was selected by the user. The HTTP method also returns three additional key/value pairs: user/23435345, session/ 123568sdfq3asdfw341, language/en. Each key is formatted to be preceded by "&" and followed by "=" (&key=) in an HTTP query syntax. Alternatively, if the key is within the curly braces of a JAVA script object notation (JSON) object, the key is preceded by quotation marks and followed by quotation marks and a colon ("key":). Other formatting for the keys is also possible. Each page view value is formatted to correspond to the associated page view key. For example, the page view value associated with the page view key &language= is a two-letter code.

The pageview event "user.click" has both the page view key "url" and the page view key "value". The "url" key indicates the webpage the user was on when the user clicked on a link to the webpage indicated by the "value" key. In the "user.click" example in FIG. 4, a user being served the webpage www.coursera.org has clicked on a link to the webpage of a course "class.coursera.org/yolo-001". An HTTP method calling the pageview event "api.ok.200" returns a page view value indicating how long it took to fulfill an API call. The time value is formatted inside curly braces {"timing":294} and indicates that it took 294 seconds to fulfill the API call. The pageview event "user.scroll" has a page view key "value" that indicates the number of pixels that have been scrolled down from the top of the field being viewed. In the example of FIG. 4, the highest pixel in the viewable field is 823 pixels lower than the top of the entire scrollable image. While the user has clicked on the scroll bar (regardless of whether the user is scrolling up or down), the "user.scroll" event returns the current pixel position every two seconds.

In addition, the first user 64 also uses the network device 3 to interact with the second portion 34 of the web page 8. The user clicks on one of the selectable graphical user interface elements 35-38 or 44. Due to the javascript of the web page (javascript tracking code 10 from web page 8 in combination with the amount 15 of downloaded javascript), the user's key click is detected by browser 12, and in response the main code portion 16 causes an API call (step 109) to be made to the video player application program 13 executing on the network device 3. This API call is represented in FIG. 1 by arrow 47. In response, the video player 13 returns a "video data value" (step 110) back to the main code section 16. The video data value is the value of an associated "video data key". The return of the "video view value" is represented in FIG. 1 by arrow 48.

FIG. 5 is a table that sets forth various exemplary video data keys. For each video data type of event, the right column of FIG. 5 gives examples of the format of the video data key and associated video data value. The illustrated example of a user.video.lecture.play event includes key/value pairs for the keys url, user and session used in the pageview event plus several additional video data key/value pairs formatted inside curly braces following the aggregate key "value". Some of the video data keys include: currentTime, prevTime, eventTimestamp, initTimestamp and playbackRate. The key/value pair for the playback speed is "playbackRate":1, which signifies that the video is being played at normal speed. The video data value ranges from 0.75 to 1.5 to indicate a range from slow playback to accelerated playback. FIG. 5 also illustrates ranges and formatting for key/value pairs for video types of events such as pause, seek, speed and volume. The key/value pairs that are unique to video data and that are not used in page view events are aggregated within curly braces after the key "value". This permits key/value pairs for video data to be returned in response to an HTTP method in the same manner as key/value pairs for page view events. For example, the user.video.lecture.pause event shown in FIG. 5 indicates both the time at which the user clicked the pause button 35 and the progress of the video at the time the user clicked the pause button. ("eventTimestamp":1394137297581, "currentTime":141.293548)

In one example, the script of the main code section 16 that makes the API call to video player 13 in order to obtain the video data value 56 mentioned above is implemented in the same manner as is YouTube Analytics code that makes Javascript API calls to a JW Player to obtain engagement metrics and the current playback state of the player, or to trigger an event on detection of a particular condition. Information about YouTube Analytics is available from GET https://www.google.APIs.com/youtube.

The main code portion 16 then causes the browser 12 to send (step 111) two key/value pairs 51 and 54 to the analytics web server 4 across a single TCP/IP connection in one or more HTTP requests, where the value of the first key/value pair 51 is the "page view value" obtained from the HTTP method, and where the value of the second key/value pair 54 is the "video data value" obtained from the video player application program. In each key/value pair, the key indicates the type of data and the value indicates the value of the associated key. In the illustrated example of FIG. 1, the first key/value pair 51 indicates that the value www-.coursera.org is of the key type url. In the illustrated example of FIG. 1, the second key/value pair 54 indicates that the value "10" is of the key type volume. In the example of FIG. 1, the first key/value pair 51 is sent from the network device 3 to the analytics web server 4 in a first HTTP request 49, and the second key/value pair 54 is sent from the network device 3 to the analytics web server 4 in a second HTTP request 50.

Figure 6:
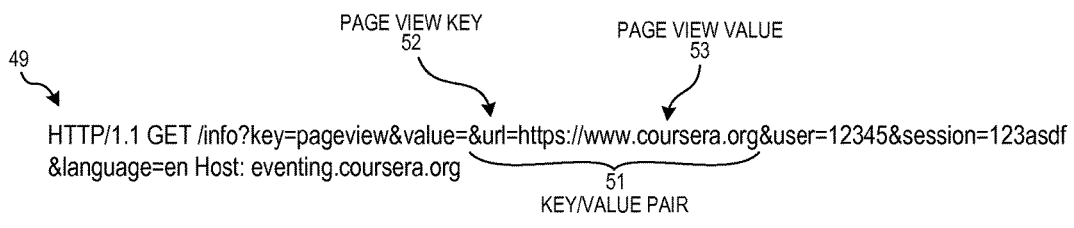
FIG. 6 is a diagram that illustrates an HTTP request that communicates a key/value pair, where the value is a page view value.

FIG. 6 is a simplified diagram that illustrates the first HTTP request 49 that encapsulated the first key/value pair 51. The first key/value pair 51 includes the "url" page view key 52 and the associated page view value 53. The value 53 is in a format associated with the url key. The first key/value pair 51 also includes the "user" page view key and the associated page view value "12345". The format of the value is determined by the "user" key.

Figure 7:
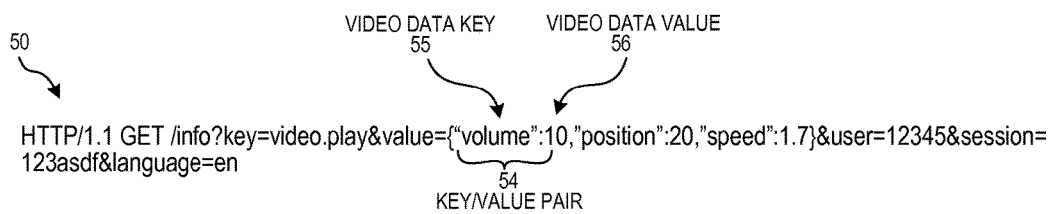
FIG. 7 is a diagram that illustrates an HTTP request that communicates a key/value pair, where the value is a video data value.

FIG. 7 is a simplified diagram that illustrates the second HTTP request 50 that encapsulated the second key/value pair 54. The second key/value pair 54 includes the "volume" video data key 55 and the associated video data value 56. The value 56 is in a format determined by the key. For example, the volume is indicated by a two-digit value. FIGS. 6 and 7 are simplified, however. In a typical example, in addition to the key/value pair or pairs communicated as illustrated in FIGS. 6 and 7, for every event the javascript client on network device 3 collects and transmits the following information to the analytics web server 4:

1) Username: this is either blank or consists of a user ID. This username value allows identification of who executed certain events. The value of the user ID depends on whether the individual is currently logged into a website of the analytics company or not. 2) User IP: this is the IP address of the first user's network device 3. 3) User Agent: browser user agent string. 4) Timestamp: this is a numeric field that indicates the time (in UTC) that an event occurs. 5) Page URL: this is the page URL associated with the event. 6) Language: indicates the browser's language preference. 7) From URL: this is the referrer URL for a page. 8) Session: browser session cookie. 9) Client: this is a keyword that describes the context of the event.

The two key/value pairs 51 and 54 are received (step 112) via the single TCP/IP connection onto the analytics web server 4 and are stored in a data base 57. This data base 57 stores both page view values and video data values in a single data structure. The communication of the key/value pairs to the analytics program 20 and then into the data base 57 is illustrated in FIG. 1 by arrows 60 and 61.

The analytics web server 4 then performs (step 113) real time processing on the event data stored in the data base 57, where the processed event data includes the page view data value received as part of the first key/value pair 51, and where the processed event data also includes the video data value received as part of the second key/value pair 54. Real time processing here means that a report indicating the result of the processing is generated within one minute of when the video data value 56 was output by the video player application program 13 and also was generated within one minute of when the page view value 53 was output by the HTTP method 17. Arrow 62 in FIG. 1 illustrates the retrieval of key/value pair information from data base 57 for processing.

A second user 65 (for example, the instructor or an individual from the web serving and analytics company) can then use the network device 5 to request a report 58 from the analytics web server 4. The second user 65 uses network device 5 to issue an HTTP request 57 to the analytics web server 4 to retrieve the report 58. The HTTP request 57 is processed up the stack 18 to the HTTP web server program 19. The HTTP web server program 19 in turn requests the report from the analytics program 20. Arrow 63 represents the communication of the report 58 from the analytics program 20 back to the HTTP web server program 19. The HTTP response 59 is processed down the stack 18 of the analytics web server 4 and is sent (step 114) across the internet 6 to network device 5 as part of an HTTP response 59. In the example of FIG. 1, the report 58 is received by network device 5 within one minute of when the page view value 53 was output by the HTTP method 17 and within one minute of when the video data value 56 was output by the video player application program 13. Typically, the second user 65 uses a browser (not illustrated) executing on network device 5 to request the report 58 from analytics web server 4 in order to retrieve the report 58 from the analytics web server 4 and to view the report 58 on a display of network device 5.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising: receiving, by an analytics web server and from a content viewing network device including a display, a video player, and a browser, a plurality of HTTP requests by way of a single TCP/IP connection between the content viewing network device and the analytics web server, at least one HTTP request encapsulating at least a first key/value pair for a video data type of event including keys: pause, seek, speed and volume, and at least one HTTP request encapsulating at least a second key/value pair for a page view type of event including keys: URL, user, and session, the first key/value pair including a video data key and an associated video data value for a video viewable in a first portion of a web page rendered by the browser on the display, the second key/value pair including a page view key and an associated page view value for textual materials viewable in a second portion of the web page rendered by the browser on the display, the textual materials being associated with the video, the video data value being generated by the video player as a result of an Application Programming Interface (API) call made to the video player, and the page view value being generated as a result of a method call made to an HTTP method installed in the browser, wherein the first keys for the video data type of event include at least one second key used for the page view event and at least one video data key unique to video data and that is not used for the page view event, and wherein in the at least one HTTP request encapsulating the at least first key/value pair for the video data type of event, the key/value pairs that are unique to video data and that are not used in page view events are aggregated in a key value field of the at least the first key/value pair for the video data type of event; storing, in a database included in the analytics web server, the first key/value pair and the second key/value pair; analyzing, by the analytics web server, the data stored in the database, the data including the first key/value pair and the second key/value pair; and generating, by the analytics web server, a report including a result of the analysis.

2. The method of claim 1, wherein the video data value is a setting value of the video player included in the content viewing network device.

3. The method of claim 1,
wherein the page view value is related to an interaction with a user selectable graphical user interface element included in the textual materials, the user selectable graphical user interface element being associated with the page view key, and
wherein the page view value is taken from a group consisting of: a web page button value, a web page link value, and a value indicative of a click on a web page graphical element.

4. The method of claim 1, further comprising:
storing the first key/value pair and the second key/value pair in the database in a single data structure.

5. The method of claim 1,
wherein receiving the at least one HTTP request encapsulating the first key/value pair and the second key/value pair includes:
receiving the first key/value pair at a first time T1; and
receiving the second key/value pair at a second time T2; and
wherein the method further comprises outputting the report at a third time T3, wherein T3 minus T1 is less than one second, and wherein T3 minus T2 is less than one second.

6. The method of claim 5, wherein receiving the at least one HTTP request encapsulating the first key/value pair and the second key/value pair includes receiving the first key/value pair and the second key/value pair as parts of the same HTTP request, wherein the first time T1 is equal to the second time T2.

7. The method of claim 5, wherein receiving the at least one HTTP request encapsulating the first key/value pair and the second key/value pair includes:
receiving the first key/value pair as part of a first HTTP request; and
receiving the second key/value pair as part of a second HTTP request, wherein the first time T1 is not equal to the second time T2.

8. A method comprising: installing, on a content viewing network device including a display, a video player, and a browser, a page view user interactions tracking method; subsequent to installing the page view user interactions tracking method, rendering, by the-browser, a web page including a first portion and a second portion; making an Application Programming Interface (API) call to the video player; responsive to making the API call, obtaining, from the video player, a video data value generated by the video player, the video data value being associated with a video viewable in the first portion of the web page; making a method call to the page view user interactions tracking method; responsive to making the method call, obtaining, from the page view user interactions tracking method, a page view value generated by the page view user interactions tracking method, the page view value being associated with textual materials viewable in the second portion of the web page and associated with the video; and sending, by the content viewing network device and to an analytics web server, a plurality of HTTP requests by way of a single TCP/IP connection between the content viewing network device and the analytics web server, at least one HTTP request encapsulating a first key/value pair for a video data type of event including keys: pause, seek, speed and volume, and at least one HTTP request encapsulating at least a second key/value pair for a page view type of event including keys: URL, user, and session, wherein the first keys for the video data type of event include at least one second key used for the page view event and at least one video data key unique to video data and that is not used for the page view event, and wherein in the at least one HTTP request encapsulating the at least first key/value pair for the video data type of event, the key/value pairs that are unique to video data and that are not used in page view events are aggregated in a key value field of the at least the first key/value pair for the video data type of event.

9. The method of claim 8,
wherein the page view value is related to an interaction with a user selectable graphical user interface element included in the textual materials, the user selectable graphical user interface element being associated with the page view key, and
wherein the page view value is taken from a group consisting of: a web page button value, a web page link value, and a value indicative of a click on a web page graphical element.

10. The method of claim 8, wherein installing, on the content viewing network device, the page view user interactions tracking method includes:
receiving an HTTP response from the analytics web server, the HTTP response including a script;
interpreting the script on the content viewing network device; and
downloading the page view user interactions tracking method onto the content viewing network device.

11. The method of claim 8, wherein sending the at least on HTTP request encapsulating the first key/value pair and the second key/value pair includes:
sending the first key/value pair as part of a first HTTP request; and
sending the second key/value pair as part of a second HTTP request.

12. A system comprising: means for receiving, from a network device including a display, a video player, and a browser, a plurality of HTTP requests by way of a single TCP/IP connection to the system, at least one HTTP request encapsulating at least a first key/value pair for a video data type of event including keys: pause, seek, speed and volume, and at least one HTTP request encapsulating at least a second key/value pair for a page view type of event including keys: URL, user, and session, the first key/value pair including a video data key and an associated video data value for a video viewable in a first portion of a web page rendered by the browser on the display, and the second key/value pair including a page view key and an associated page view value for textual materials viewable in a second portion of the web page rendered by the browser on the display, the textual materials being associated with the video, the video data value being generated by the video player as a result of an Application Programming Interface (API) call made to the video player, and the page view value being generated as a result of a method call made to an HTTP method installed in the browser, wherein the first keys for the video data type of event include at least one second key used for the page view event and at least one video data key unique to video data and that is not used for the page view event, and wherein in the at least one HTTP request encapsulating the at least first key/value pair for the video data type of event, the key/value pairs that are unique to video data and that are not used in page view events are aggregated in a key value field of the at least the first key/value pair for the video data type of event; means for storing, in a database included in the system, the first key/value pair and the second key/value pair; means for analyzing data stored in the database, the data including the first key/value pair and the second key/value pair; means for generating a report including a result of the analysis; and means for outputting the report.

13. The system of claim 12,
wherein receiving the at least one HTTP request encapsulating the first key/value pair and the second key/value pair includes:
receiving the first key/value pair at a first time T1;
receiving the second key/value pair at a second time T2; and
wherein means for outputting the report includes outputting the report at a third time T3, wherein T3 minus T1 is less than one second, and wherein T3 minus T2 is less than one second.

14. The system of claim 12, wherein the means for receiving the at least one HTTP request and the means for outputting the report are parts of a protocol processing stack executing on a processor included in the system, and wherein the means for analyzing is an analytics program executing on the processor.

15. The system of claim 12, wherein the first key/value pair and second key/value pair are received by the system as parts of a single HTTP request.

16. The system of claim 12, wherein the first key/value pair is received by the system as part of a first HTTP request, and wherein the second key/value pair is received by the system as part of a second HTTP request.

17. The system of claim 12,
wherein the page view value is related to an interaction with a user selectable graphical user interface element included in the textual materials, the user selectable graphical user interface element being associated with the page view key, and
wherein the page view value is taken from a group consisting of: a web page button value, a web page link value, and a value indicative of a click on a web page graphical element.

18. The system of claim 12, wherein the video data value is a value output by the video player included in the network device.

\* \* \* \* \*